United States Patent
Yoshida

(10) Patent No.: US 6,192,199 B1
(45) Date of Patent: Feb. 20, 2001

(54) RANGEFINDER APPARATUS

(75) Inventor: Hideo Yoshida, Saitama (JP)

(73) Assignee: Fuji Photo Optical Co., Ltd., Saitama (JP)

(*) Notice: Under 35 U.S.C. 154(b), the term of this patent shall be extended for 0 days.

(21) Appl. No.: 09/420,577

(22) Filed: Oct. 19, 1999

(30) Foreign Application Priority Data

Oct. 21, 1998 (JP) .................................. 10-299909

(51) Int. Cl.⁷ .............................. G03B 13/36; G01C 3/08

(52) U.S. Cl. ...................... 396/106; 396/120; 356/3.04

(58) Field of Search ..................... 396/106, 120; 356/3.04, 3.05; 250/201.4, 201.6

(56) References Cited

U.S. PATENT DOCUMENTS 5,337,116 * 8/1994 Nonaka et al. ............... 396/106
5,659,387    8/1997 Yoshida ........................ 356/4.01

FOREIGN PATENT DOCUMENTS 7-181038    7/1995 (JP) .

* cited by examiner

Primary Examiner—W. B. Perkey
(74) Attorney, Agent, or Firm—Leydig, Voit & Mayer, Ltd.

(57) ABSTRACT

In a rangefinder apparatus, a luminous flux is projected from an infrared emitting diode (IRED) toward an object at a distance to be measured and the reflected light of the projected luminous flux is detected by a position sensitive detector (PSD). The signal output from the PSD is arithmetically processed by signal processing circuits and an arithmetic circuit and output as a distance signal. An integrating circuit integrates the distance signal output from the arithmetic circuit as an integration result and a reference voltage, compares the two integration results, and outputs a comparison result signal corresponding to the comparison. According to the signal output from the integrating circuit, a CPU measures the time required for the second integration and detects the distance to the objected according to the time measured. After a lapse of a time from the output of the comparison signal by the integrating circuit, if it is determined that there is an output of the integration result signal, then the measurement of the second integration time is terminated.

5 Claims, 4 Drawing Sheets

RANGEFINDER APPARATUS

BACKGROUND OF THE INVENTION

1. Field of the Invention

The present invention relates to a rangefinder apparatus for measuring the distance to an object, and, in particular, to an active type rangefinder apparatus suitably used in a camera or the like.

2. Related Background Art

In active type rangefinder apparatus used in cameras and the like, an infrared light-emitting diode (IRED) projects a luminous flux toward an object to be measured, the reflected light of thus projected luminous flux is received by a position sensitive detector (PSD), a signal outputted from the PSD is arithmetically processed by a signal processing circuit and an arithmetic circuit and then is outputted as distance information, and the distance to the object is detected by a CPU. Namely, an integrating capacitor charged with a reference voltage $V_{REF}$ is discharged by a voltage value corresponding to the distance information signal. As a consequence, the voltage of the integrating capacitor decreases stepwise ($C_{INT}$ in FIG. 1: first integration) as the distance information signal is inputted every time the IRED emits light (when the INT signal in FIG. 1 is HIGH). Thereafter, the integrating capacitor is charged at a constant rate determined by the rating of a constant current source ($C_{INT}$ in FIG. 1: second integration). Then, the time required for the second integration is measured, and the distance to the object is detected according to thus measured time.

SUMMARY OF THE INVENTION

Meanwhile, in the above-mentioned rangefinder apparatus, a comparator compares the voltage of the integrating capacitor and the reference voltage $V_{REF}$ during the period of the second integration. If it is determined that they coincide with each other, the comparator outputs the $S_{OUT}$ signal (the $S_{OUT}$ signal is made HIGH), so as to stop charging the integrating capacitor and terminate the measurement of the time required for the second integration.

If a wrong $S_{OUT}$ signal is outputted due to chattering and the like, however, then the integrating capacitor will not be charged with the reference voltage $V_{REF}$ but with a voltage lower than that by $\Delta V$. As a consequence, the time required for the second integration will be measured shorter, whereby errors will occur in detection of the distance to the object.

It is an object of the present invention to provide a rangefinder apparatus which can reduce errors in distance measurement.

The rangefinder apparatus in accordance with the present invention comprises: light-projecting means for projecting a luminous flux toward an object to be measured; light-receiving means for receiving reflected light of the luminous flux projected to the object at a light-receiving position on a position sensitive detector corresponding to a distance to the object, and outputting a signal corresponding to the light-receiving position; arithmetic means for carrying out an arithmetic operation according to the signal outputted from the light-receiving means, so as to output a distance signal corresponding to the distance to the object; integrating means, having an integrating capacitor, for carrying out first integration by discharging or charging the integrating capacitor according to the distance signal outputted from the arithmetic means so as to integrate the distance signal outputted from the arithmetic means, then carrying out second integration by charging or discharging the integrating capacitor with a constant current, and comparing the voltage of the integrating capacitor and a reference voltage with each other upon the second integration, so as to output a comparison result signal corresponding to the result of comparison; and detecting means for measuring the time of the second integration according to the comparison result signal outputted from the integrating means, and detecting the distance to the object according to the result of measurement; the rangefinder apparatus further comprising: comparison result signal detecting means for detecting, when the comparison result signal is outputted by the integrating means, whether or not there is an output of the comparison result signal after a lapse of a predetermined time from the outputting of the comparison result signal; and measurement terminating means for terminating the measurement of the time of the second integration when it is determined by the comparison result signal detecting means that there is an output of the comparison result signal.

In the rangefinder apparatus in accordance with the present invention, after a lapse of a predetermined time from the outputting of the comparison result signal by the integrating means, the comparison result signal detecting means detects whether or not there is an output of the comparison result signal. If it is determined that there is an output of the comparison result signal, then the measurement of the time of the second integration is terminated by the measurement terminating means. As a consequence, even when an output of the comparison result signal is generated due to chattering and the like, the time of the second integration can be measured accurately, whereby errors in distance measurement can be prevented from occurring.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, an embodiment of the present invention will be explained in detail with reference to the accompanying drawings. Here, the following explanation relates to a case where an active type rangefinder apparatus is employed as a rangefinder apparatus of an autofocus type camera.

Figure 1:
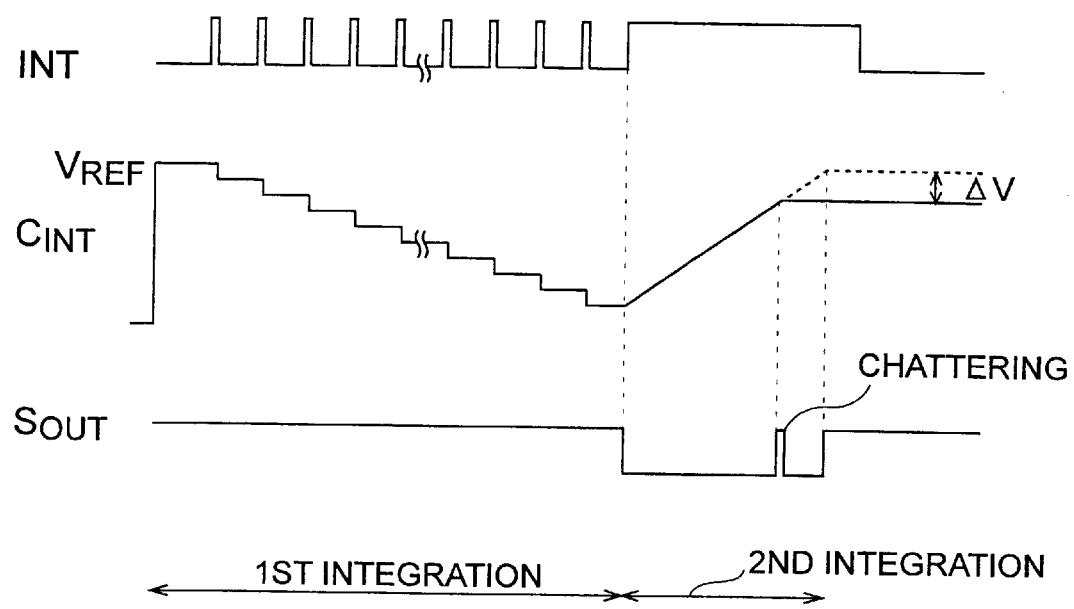
FIG. 1 is a timing chart for explaining operations of a conventional rangefinder apparatus.
Figure 2:
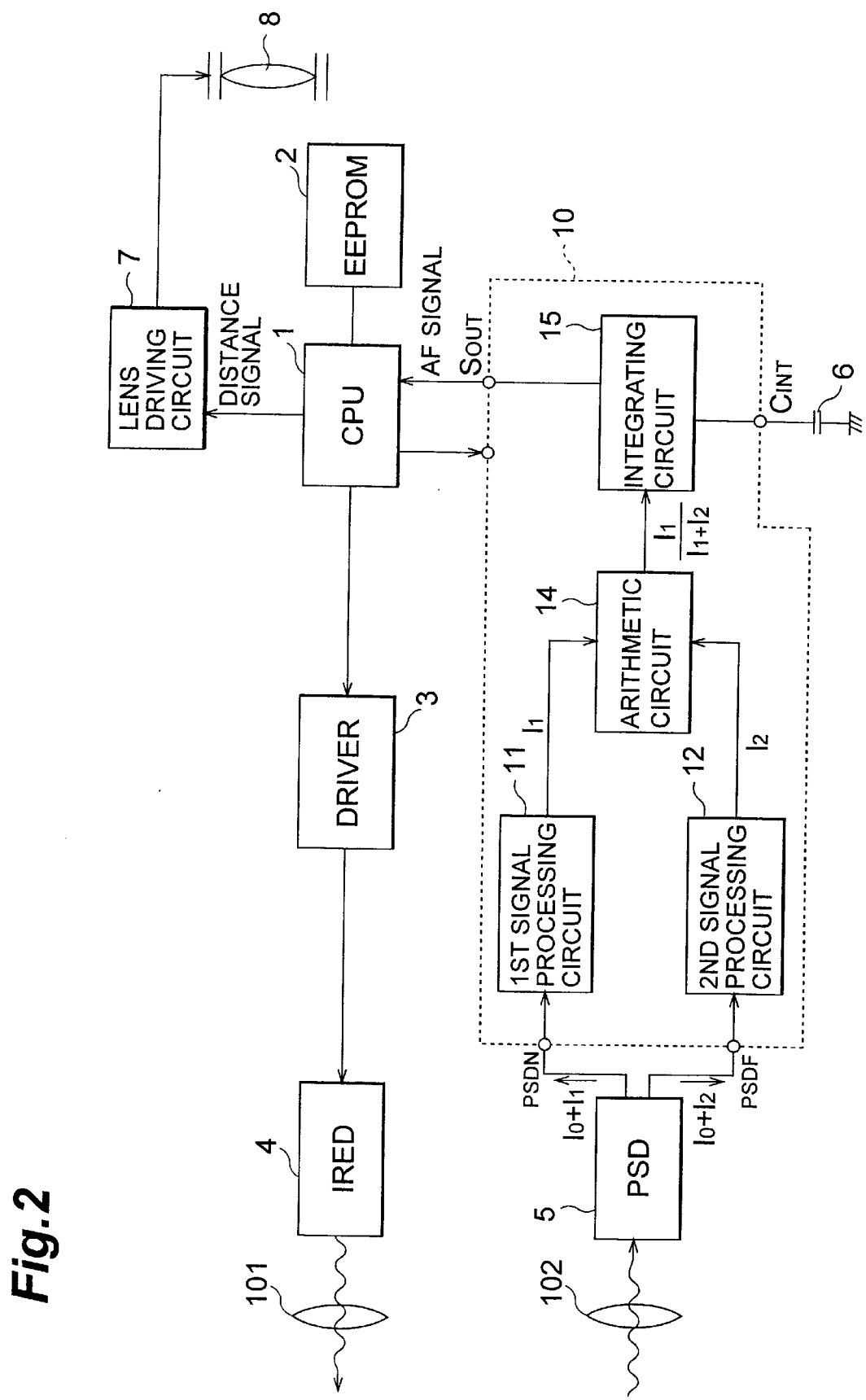
FIG. 2 is a configurational view of the rangefinder apparatus in accordance with an embodiment of the present invention.

FIG. 2 is a configurational view of the rangefinder apparatus in accordance with this embodiment. A CPU 1 is used for controlling the whole camera equipped with this rangefinder apparatus, and controls the whole camera including the rangefinder apparatus according to a program and parameters prestored in an electrically erasable and programmable read-only memory (EEPROM) 2. In this rangefinder apparatus, the CPU 1 regulates a driver 3, so as to control the emission of infrared light from an IRED (infrared light-emitting diode) 4. Also, the CPU 1 controls actions of an autofocus IC (AFIC) 10, and inputs the AF signal outputted from the AFIC 10.

By way of a light-projecting lens 101 disposed at the front face of the IRED 4, the infrared light emitted from the IRED 4 is projected onto the object to be measured. The infrared light is partly reflected by the object, and the resulting reflected light is received, by way of a light-receiving lens 102 disposed at the front face of a PSD (position sensitive detector) 5, at a position on the light-receiving surface of the PSD 5. This light-receiving position corresponds to the distance to the object.

The PSD 5 outputs two signals $I_1$ and $I_2$ which correspond to the light-receiving position. The signal $I_1$ is a near-side signal which has a greater value as the distance is shorter if the quantity of received light is constant, whereas the signal $I_2$ is a far-side signal which has a greater value as the distance is longer if the quantity of received light is constant. The sum of the signals $I_1$ and $I_2$ represents the quantity of reflected light received by the PSD 5. The near-side signal $I_1$ is inputted to the PSDN terminal of the AFIC 10, whereas the far-side signal $I_2$ is inputted to the PSDF terminal of the AFIC 10. In practice, however, depending on external conditions, there are cases where respective signals in which a steady-state light component $I_0$ is added to the near-side signal $I_1$ and far-side signal $I_2$ are fed into the AFIC 10.

The AFIC 10 is an integrated circuit (IC) constituted by a first signal processing circuit 11, a second signal processing circuit 12, an arithmetic circuit 14, and an integrating circuit 15. The first signal processing circuit 11 inputs therein a signal $I_1+I_0$ outputted from the PSD 5, and eliminates the steady-state light component $I_0$ therefrom, thereby outputting the near-side signal $I_1$. The second signal processing circuit 12 inputs therein a signal $I_2+I_0$ outputted from the PSD 5, and eliminates the steady-state light component $I_0$ therefrom, thereby outputting the far-side signal $I_2$.

The arithmetic circuit 14 inputs therein the near-side signal $I_1$ outputted from the first signal processing circuit 11 and the far-side signal $I_2$ outputted from the second signal processing circuit 12, calculates the output representing the result thereof. Here, the output ratio ($I_1/(I_1+I_2)$) represents the light-receiving position on the light-receiving surface of the PSD 5, i.e., the distance to the object.

The integrating circuit 15 inputs therein the output ratio signal and, together with an integrating capacitor 6 connected to the $C_{INT}$ terminal of the AFIC 10, accumulates the output ratio a plurality of times, thereby improving the S/N ratio. Thus accumulated output ratio is outputted from the $S_{OUT}$ terminal of the AFIC 10 as the AF signal. The CPU 1 inputs therein the AF signal outputted from the AFIC 10, converts the AF signal into a distance signal by carrying out a predetermined arithmetic operation, and sends out the resulting distance signal to a lens driving circuit 7. According to this distance signal, the lens driving circuit 7 causes a taking lens 8 to effect a focusing action.

Figure 3:
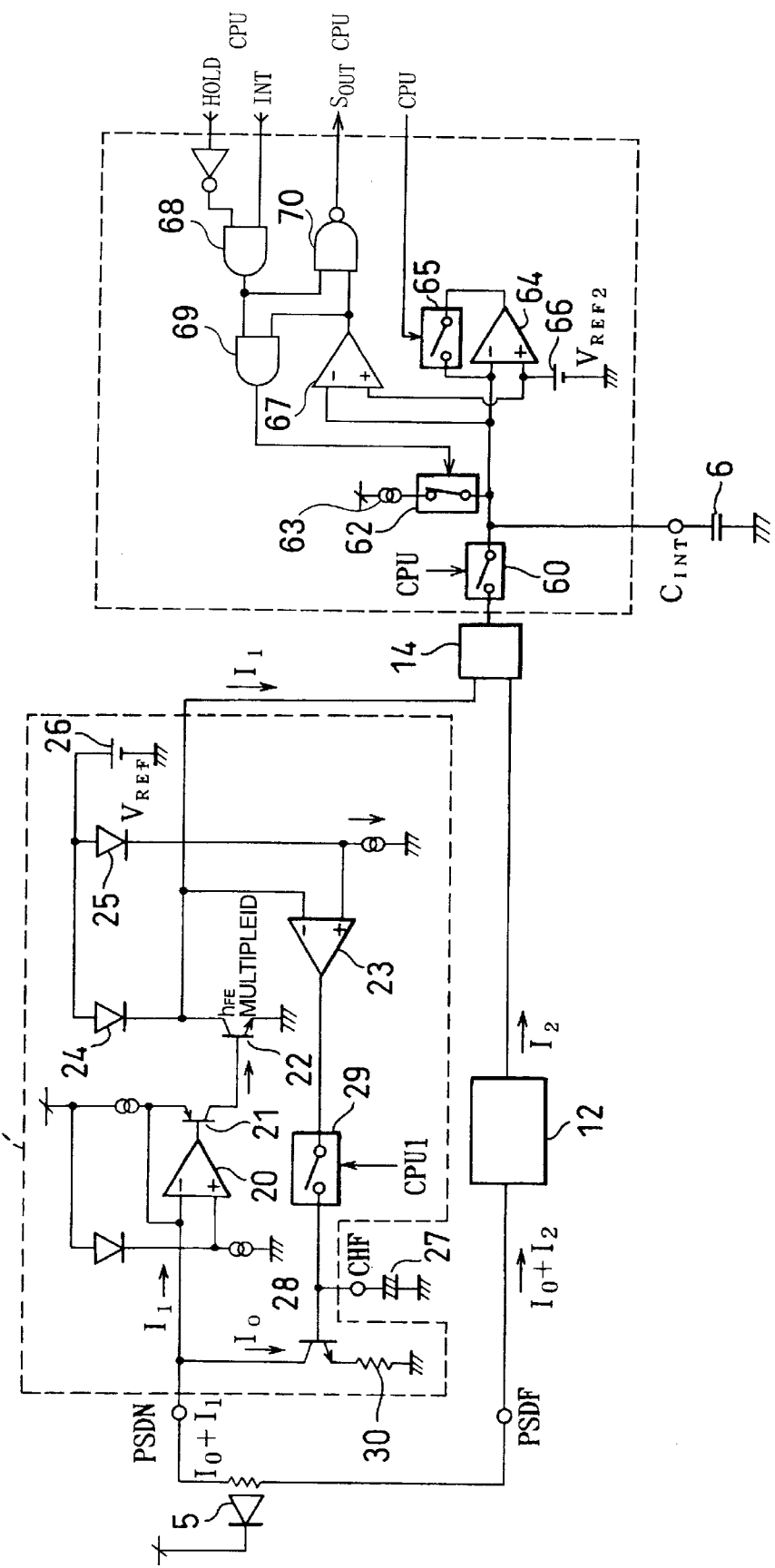
FIG. 3 is a circuit diagram of the first signal processing circuit and integrating circuit in the rangefinder apparatus in accordance with the above-mentioned embodiment.

More specific respective circuit configurations of the first signal processing circuit 11 and integrating circuit 15 in the AFIC 10 will now be explained. FIG. 3 is a circuit diagram of the first signal processing circuit 11 and integrating circuit 15. Here, the second signal processing circuit 12 has a circuit configuration similar to that of the first signal processing circuit 11.

As mentioned above, the first signal processing circuit 11 is a circuit which inputs therein the near-side signal $I_1$ with the steady-state light component $I_0$ outputted from the PSD 5, eliminates the steady-state light component $I_0$, and outputs the near-side signal $I_1$. Namely, the near-distance-side terminal of the PSD 5 is connected to the "−" input terminal of an operational amplifier 20 in the first signal processing circuit 11 by way of the PSDN terminal of the AFIC 10. The output terminal of the operational amplifier 20 is connected to the base terminal of a transistor 21, whereas the collector terminal of the transistor 21 is connected to the base terminal of a transistor 22. The collector terminal of the transistor 22 is connected to the "−" input terminal of an operational amplifier 23 and also to the arithmetic circuit 14. Further, the cathode terminal of a compression diode 24 is connected to the collector terminal of the transistor 22, whereas the cathode terminal of a compression diode 25 is connected to the "+" input terminal of the operational amplifier 23. A first reference power source 26 is connected to the respective anode terminals of the compression diodes 24 and 25.

Also, a steady-state light eliminating capacitor 27 is externally attached to the CHF terminal of the AFIC 10, and is connected to the base terminal of a steady-state light eliminating transistor 28 within the first signal processing circuit 11. The steady-state light eliminating capacitor 27 and the operational amplifier 23 are connected to each other by way of a switch 29, whose ON/OFF is controlled by the CPU 1. The collector terminal of the steady-state light eliminating transistor 28 is connected to the "−" input terminal of the operational amplifier 20, whereas the emitter terminal of the transistor 28 is grounded by way of a resistor 30.

The integrating circuit 15 has the following configuration. The integrating capacitor 6 externally attached to the $C_{INT}$ terminal of the AFIC 10 is connected to the output terminal of the arithmetic circuit 14 by way of a switch 60, and to a constant current source 63 by way of a switch 62. Also, it is connected to the output terminal of an operational amplifier 64 by way of a switch 65, and directly to the "−" input terminal of the operational amplifier 64. Further, the integrating capacitor 6 is connected to the "−" input terminal of a comparator 67. Also, a second reference power source $V_{REF2}$ is connected to the "+" input terminal of the comparator 67 and "+" input terminal of the operational amplifier 64.

The HOLD signal is inputted to one input terminal of an AND circuit 68 by way of an inverter, whereas the INT signal is inputted to the other input terminal. The output terminal of the AND terminal 68 is connected to one input terminal of an AND circuit 69, whereas the output terminal of the comparator 67 is connected to the other input terminal of the AND circuit 69. The switch 62 is controlled by the output of the AND circuit 69.

The output terminal of the comparator 67 is connected to one input terminal of a NAND circuit 70, the output terminal of the AND circuit 68 is connected to the other input terminal of the NAND circuit 70, and the $S_{OUT}$ signal is outputted from the output terminal of the NAND circuit 70.

Here, the switches 60 and 65 are controlled by control signals from the CPU 1.

The outline of operations of thus configured AFIC 10 will now be explained with reference to FIGS. 2 and 3. When not causing the IRED 4 to emit light, the CPU 1 keeps the switch 29 of the first signal processing circuit 11 in its ON state. The steady-state light component $I_0$ outputted from the PSD 5 at this time is inputted to the first signal processing circuit 11, and is amplified as a current by the current amplifier constituted by the operational amplifier 20 and the transistors 21 and 22. Thus amplified signal is logarithmically compressed by the compression diode 24, so as to be converted into a voltage signal, which is then fed to the "−" input terminal of the operational amplifier 23. When the signal inputted to the operational amplifier 20 is higher, the cathode potential of the compression diode 24 becomes higher, thus increasing the signal outputted from the operational amplifier 23, whereby the steady-state light eliminating capacitor 27 is charged. As a consequence, a base current is supplied to the transistor 28, so that a collector current flows into the transistor 28, whereby, of the signal $I_0$ fed into the first signal processing circuit 11, the signal inputted to the operational amplifier 20 decreases. In the state where the operation of this closed loop is stable, all of the signal $I_0$ inputted to the first signal processing circuit 11 flows into the transistor 28, whereby the charge corresponding to the base current at this time is stored in the steady-state light eliminating capacitor 27.

When the CPU 1 turns OFF the switch 29 while causing the IRED 4 to emit light, of the signal $I_1+I_0$ outputted from the PSD 5 at this time, the steady-state light component $I_0$, flows as the collector current into the transistor 28 to which the base potential is applied by the charge stored in the steady-state light eliminating capacitor 27, whereas the near-side signal $I_1$ is amplified as a current by the current amplifier constituted by the operational amplifier 20 and the transistors 21 and 22 and then is logarithmically compressed by the compression diode 24, so as to be converted into and outputted as a voltage signal. Namely, from the first signal processing circuit 11, the near-side signal $I_1$ is outputted alone after the steady-state light component $I_0$ is eliminated, and thus outputted near-side signal $I_1$ is inputted to the arithmetic circuit 14. From the second signal processing circuit 12, on the other hand, as with the first signal processing circuit 11, the far-side signal $I_2$ is outputted alone after the steady-state light component $I_0$ is eliminated, and thus outputted far-side signal $I_2$ is inputted to the arithmetic circuit 14.

The near-side signal $I_1$ outputted from the first signal processing circuit 11 and the far-side signal $I_2$ outputted from the second signal processing circuit 12 are inputted to the arithmetic circuit 14, and the output ratio ($I_1/(I_1+I_2)$) is calculated by the arithmetic circuit 14 and is outputted to the integrating circuit 15. While the IRED 4 is emitting a predetermined number of pulses of light, the switch 60 of the integrating circuit 15 is kept in its ON state, whereas the switches 62 and 65 are turned OFF, whereby the output ratio signal outputted from the arithmetic circuit 14 is stored in the integrating capacitor 6. When a predetermined number of pulse light emissions are completed, then the switch 60 is turned OFF, whereas the switch 65 is turned ON, whereby the charge stored in the integrating capacitor 6 is reduced by the charge having an opposite potential supplied from the output terminal of the operational amplifier 64.

The CPU 1 monitors the potential of the integrating capacitor 6, so as to measure the time required for regaining the original potential, and determines the AF signal according to thus measured time, thereby determining the distance to the object.

Figure 4:
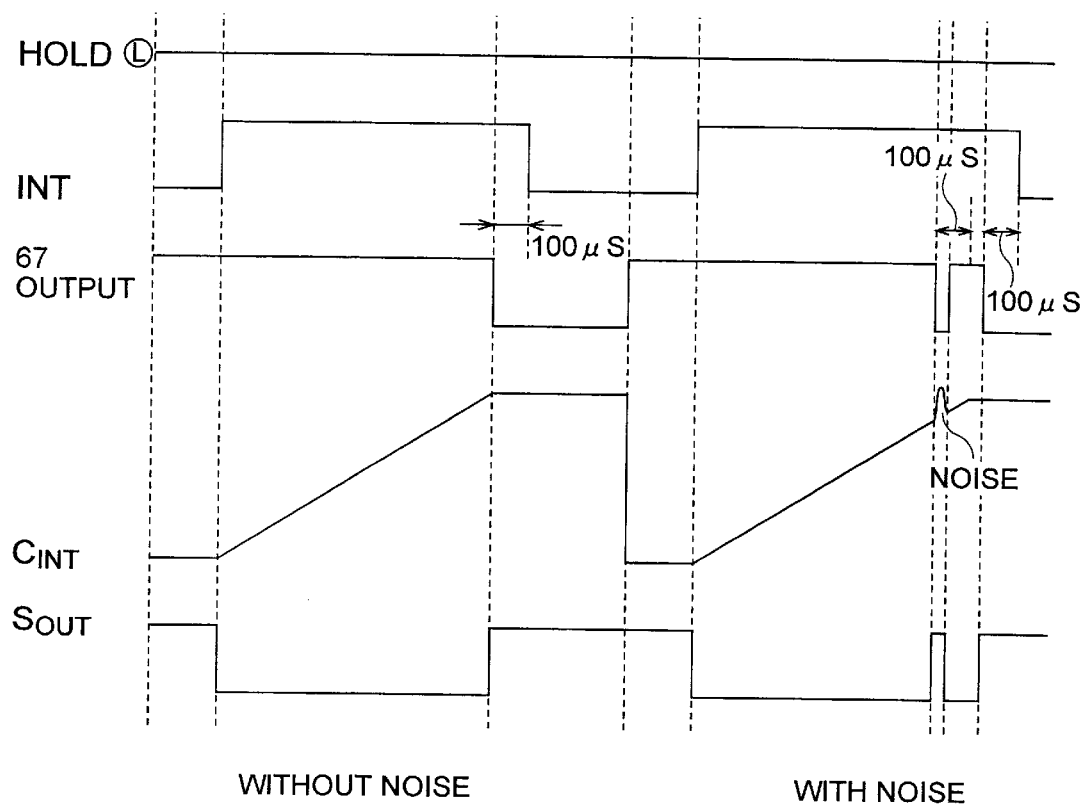
FIG. 4 is a timing chart for explaining operations of the rangefinder apparatus in accordance with the above-mentioned embodiment.

Operations of this rangefinder apparatus will now be explained. When the release button of the camera is half-pushed, so as to initiate a distance measuring state, a power source voltage supply is resumed in the AFIC 10, and the switch 65 is turned ON, whereby the integrating capacitor 6 is preliminarily charged until it attains a reference voltage $V_{REF2}$ (see the $C_{INT}$ signal in FIG. 4). After the completion of preliminary charging, the switch 65 is turned OFF. After the preliminary charging, the IRED 4 is driven with a light emission timing signal with a duty cycle outputted from the CPU 1 to the driver 3, so as emit infrared light in a pulsing fashion. The infrared light emitted from the IRED 4 is reflected by the object to be measured, and thus reflected light is received by the PSD 5.

Namely, at the same time with the light emission of the IRED 4, the switch 29 of the first signal processing circuit 11 is turned OFF, so that the near-side signal $I_1$ without the steady-state light component $I_0$ is fed into the arithmetic circuit 14. Similarly, the far-side signal $I_2$ without the steady-state light component $I_0$ is fed from the second signal processing circuit 12 into the arithmetic circuit 14. According to the near-side signal $I_1$ and far-side signal $I_2$, the arithmetic circuit 14 outputs data of the output ratio $I_1/(I_1+I_2)$. At the time when this output is stabilized, the switch 60 of the integrating circuit 15 is turned ON (the INT signal is made HIGH), whereby a negative voltage corresponding to the output ratio outputted from the arithmetic circuit 14 is inputted to the integrating capacitor 6.

The integrating capacitor 6 of the integrating circuit 15 inputs the output ratio, i.e., distance information signal, outputted from the arithmetic circuit 14, and is discharged by a voltage value corresponding to the value of the distance information signal. Namely, as indicated by the $C_{INT}$ signal in FIG. 4, the voltage of the integrating capacitor 6 decreases stepwise (first integration) as the distance signal is inputted therein every time the IRED 4 emits light. While the amount of voltage drop for each step is distance information per se, the sum of amounts of voltage drop obtained by individual pulse emissions of the IRED 4 is employed as distance information in this embodiment.

After the input to the integrating capacitor 6 by a predetermined number of light emissions is completed, the switch 60 is held in its OFF state, and the switch 62 is turned ON by a signal from the CPU 1. If the signals (the HOLD signal at LOW and the INT signal at HIGH) of the CPU 1 are inputted here, then the AND circuit 68 is set HIGH. As a consequence, the HIGH comparison output of the comparator 67 (which is set HIGH when the charging is incomplete) causes the AND circuit 69 to yield the HIGH output, thus turning ON the switch 62, whereby the integrating capacitor 6 is charged with a constant rate determined by the constant current source 63 (second integration).

During the period of this second integration, the comparator 67 compares the voltage of the integrating capacitor 6 and the reference voltage $V_{REF2}$ with each other. If it is determined that they coincide with each other, then the comparator 67 outputs the LOW signal, thus making the AND circuit 69 yield the LOW output, thereby turning OFF the switch 62, so as to stop charging the integrating capacitor 6.

Here, the second integration time measurement output $S_{OUT}$ is made HIGH by the NAND circuit 70 when the output of the AND circuit 68 is HIGH and the output of the comparator 67 is LOW.

Since the charging speed due to the constant current source 63 is constant, the sum of distance information signals inputted to the integrating capacitor 6 upon one distance measuring operation, i.e., the distance to the object, can be determined from the time required for the second integration.

Thereafter, when the release button is completely pushed, the CPU 1 controls the lens driving circuit 7 according to thus determined distance, so as to cause the taking lens 8 to carry out an appropriate focusing action, and further performs exposure by opening the shutter (not depicted). Thus, upon a release operation, a series of photographing actions comprising preliminary charging, distance measurement (first integration and second integration), focusing, and exposure is carried out.

In the rangefinder apparatus in accordance with this embodiment, even when an erroneous $S_{OUT}$ signal occurs due to chattering and the like, if the CPU 1 receives an input of the $S_{OUT}$ signal, then it confirms, after a predetermined time (100 $\mu$S) therefrom, that there is the input of the $S_{OUT}$ signal (the $S_{OUT}$ signal is HIGH), and makes the INT signal LOW thereafter, thereby setting both of the AND circuits 68, 69 LOW, so as to shift them to the state incapable of receiving the output of the comparator 67, thus terminating the measurement of the second integration. Therefore, as in the case where no chattering and the like occur, the integrating capacitor can reliably be charged until it attains the reference voltage $V_{REF2}$. As a consequence, the time required for the second integration would not be measured shorter, and errors can be prevented from occurring in the detection of the distance to the object to be measured.

Without being restricted to the above-mentioned embodiment, the present invention can be modified in various manners. For example, the present invention is also applicable to the case where the charging/discharging of the integrating circuit is the reverse of that in the above-mentioned embodiment, i.e., the integrating circuit in which a plurality of charging operations are carried out in the first integration such that the voltage of the integrating capacitor increases stepwise and then only one discharging operation is carried out in the second integration.

In accordance with the present invention, after a lapse of a predetermined time from the outputting of the comparison result signal by the integrating means, the comparison result signal detecting means detects whether or not there is an output of the comparison result signal; and if it is determined that there is an output of the comparison result signal, then the measurement terminating means terminates the measurement of the time of the second integration. As a consequence, even when an output of the comparison result signal is generated due to chattering and the like, the time of the second integration can be measured accurately, whereby errors in distance measurement can be reduced.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A rangefinder apparatus comprising:

light-projecting means for projecting a luminous flux toward an object at a distance to be measured;

light-detecting means for detecting reflected light of the luminous flux projected to the object at a light-detecting position on a position sensitive detector, corresponding to the distance to the object, and outputting a signal corresponding to said light-detecting position;

arithmetic means for carrying out an arithmetic operation according to the signal output from said light-detecting means, and outputting a distance signal corresponding to the distance to the object;

integrating means, having an integrating capacitor, for carrying out a first integration by discharging or charging said integrating capacitor according to the distance signal output from said arithmetic means by integrating the distance signal output from said arithmetic means, carrying out a second integration by charging or discharging said integrating capacitor with a constant current to a voltage, and comparing the voltage of said integrating capacitor to a reference voltage upon the second integration, and outputting a comparison result signal corresponding to the comparison;

detecting means for measuring duration of the second integration according to the comparison result signal output from said integrating means, and detecting the distance to the object according to the duration measured;

comparison result signal detecting means for detecting, when the comparison result signal is output by said integrating means, whether there is an output of the comparison result signal after a lapse of time from outputting of the comparison result signal; and measurement terminating means for terminating measurement of the duration of the second integration when said comparison result signal detecting means determines that there is an output of the comparison result signal.

2. The rangefinder apparatus according to claim 1, wherein said light-projecting means is an infrared light-emitting diode.

3. The rangefinder apparatus according to claim 1, wherein said light-detecting means outputs a near-side signal and a far-side signal.

4. The rangefinder apparatus according to claim 3, wherein said arithmetic means carries out an arithmetic operation according to an output ratio between the near-side signal and the far-side signal.

5. The rangefinder apparatus according to claim 1, wherein said arithmetic means and said integrating means are part of a single autofocus integrated circuit.

* * * * *